(12) United States Patent
Kaplan (10) Patent No.: US 8,467,810 B2
(45) Date of Patent: Jun. 18, 2013

(54) METHOD AND SYSTEM FOR REPORTING ERRORS IN A GEOGRAPHIC DATABASE

(75) Inventor: Lawrence M. Kaplan, Northbrook, IL (US)

(73) Assignee: Navteq B.V., Veldhoven (NL)

( * ) Notice: Subject to any disclaimer, the term of this patent is extended or adjusted under 35 U.S.C. 154(b) by 0 days.

(21) Appl. No.: 12/955,052

(22) Filed: Nov. 29, 2010

(65) Prior Publication Data
US 2012/0135745 A1 May 31, 2012

(51) Int. Cl.
*H04W 24/00* (2009.01)
(52) U.S. Cl.
USPC .............. 455/456.6; 455/404.1; 455/414.2; 455/425; 455/456.1; 455/457; 455/557; 455/556.1
(58) Field of Classification Search
USPC ............ 455/456.6, 404.1, 414.2, 425, 456.1, 455/457, 557, 556.1
See application file for complete search history.

(56) References Cited

U.S. PATENT DOCUMENTS

| | | | | |
|---|---|---|---|---|
| 5,596,494 | A | 1/1997 | Kuo | 634/420 |
| 5,864,632 | A | 1/1999 | Ogawa et al. | 382/113 |
| 6,253,151 | B1 | 6/2001 | Ohler et al. | 701/208 |
| 6,470,265 | B1 | 10/2002 | Tanaka | 701/208 |
| 6,718,258 | B1 | 4/2004 | Barton | 701/200 |
| 6,873,998 | B1 | 3/2005 | Dorum et al. | 707/104.1 |
| 2005/0283699 | A1 | 12/2005 | Nomura et al. | |
| 2007/0032949 | A1* | 2/2007 | Arai et al. | 701/211 |
| 2007/0129082 | A1* | 6/2007 | Thacher | 455/456.1 |
| 2009/0262974 | A1* | 10/2009 | Lithopoulos | 382/100 |
| 2010/0014712 | A1 | 1/2010 | Sampdero Diaz et al. | |
| 2010/0305854 | A1* | 12/2010 | Kammel et al. | 701/213 |
| 2011/0106448 | A1* | 5/2011 | Widmann et al. | 701/213 |

FOREIGN PATENT DOCUMENTS

GB 2 425 858 11/2006

OTHER PUBLICATIONS

European Search Report issued in related European Patent Application EP 11 19 1079 issued Apr. 10, 2012.

* cited by examiner

*Primary Examiner* — Kwasi Karikari
(74) *Attorney, Agent, or Firm* — Lempia Summerfield Katz LLC (57) ABSTRACT

A geographic database is updated using image data collected in the background of a viewing application, such as an augmented reality application, running on a mobile device. The mobile device determines a current geographic location, which is used to access an outline template generated from the geographic data. The geographic data may include sensor data or images. The outline template is compared to the image data, and an error report is provided from the differences, if any. The differences are associated with physical objects that have changed at the current geographic location from a time when the geographic database was built or last updated to the present time. A typical physical object is a building that was recently built or removed. The error report may be used to directly update the geographic database or trigger further data collection at the geographic location.

17 Claims, 10 Drawing Sheets

ERROR REPORT 901

| Index | Position | Heading |
|---|---|---|
| 1 | X1, Y1 | 0° |

FIG. 9A

ERROR REPORT 903

| Index | Position | Heading | Altitude | Timestamp | Conf. Score |
|---|---|---|---|---|---|
| 1 | X1, Y1 | 81° | 100 m | 24:00 GMT | 1.5 |

FIG. 9B

ERROR REPORT 905

907
Location Data
X1, Y1, Z1, 81°

METHOD AND SYSTEM FOR REPORTING ERRORS IN A GEOGRAPHIC DATABASE

BACKGROUND

The present embodiments generally relate to geographic data and navigation and, more particularly, to updating a navigation-related database and/or reporting discrepancies regarding geographic data.

Navigation systems or devices provide useful features, including the identification of routes to destinations or points of interests. The navigation system can determine the optimum route to be taken by the end user to travel from the origin to the destination location from geographic data. In addition, the geographic data may include information about the locations of destinations or points of interests.

The collection of geographic data for use in navigation systems may be a significant undertaking. For example, the initial collection of data about the roads, destinations, and points of interest in a geographic area may be time consuming. Also, geographic data used in navigation systems may become out-of-date. There also may be errors in collected geographic data.

Updating and checking the geographic data may involve significant efforts. Therefore, providing up-to-date and accurate geographic data, such as for use in navigation systems, is a continuing effort.

SUMMARY

In one aspect, a method for updating geographic data is provided. An outline template outlining at least one physical object from the geographic data for a particular geographic location is obtained. Difference information is received from a comparison of land-based image data with the outline template of the at least one physical object. The land-based image is generated from a mobile device at the geographic location. An error report based on the difference information is provided for updating the geographic data.

The present invention is defined by the following claims, and nothing in this section should be taken as a limitation on those claims. Further aspects and advantages of the invention are discussed below in conjunction with the preferred embodiments.

DETAILED DESCRIPTION

The number of worldwide cellular phone users has surpassed 4 billion, and 1 billion of those mobile devices are equipped with broadband communication. Web access through mobile devices may soon surpass that of desktop computers. These mobile devices can be harnessed to update or build geographic data for navigation systems. For example, the mobile devices collect image data during use of a camera or augmented reality application. The image data may be used to check the present existence or absence of physical objects with past geographic data. Physical objects include buildings, road furniture, signs, road markings, lane markings, and so on.

A set of geographic data represents roads and points of interest, which may include buildings or other landmarks. The points of interest may change. For example, subsequent to the creation of the set of geographic data, a new building is built. The new building is observed using a camera in a mobile device. The camera captures an image that includes at least a portion of the new building. The image is indexed with location data, which may include a compass heading, and compared with a data template generated from the set of geographic data. If the comparison with the data template indicates that the geographic data does not represent the new building, an error report is sent to a map developer. Accordingly, the geographic data can be updated either automatically or after verification through visiting the location with a mapping vehicle or other agent of the map developer.

Figure 1:
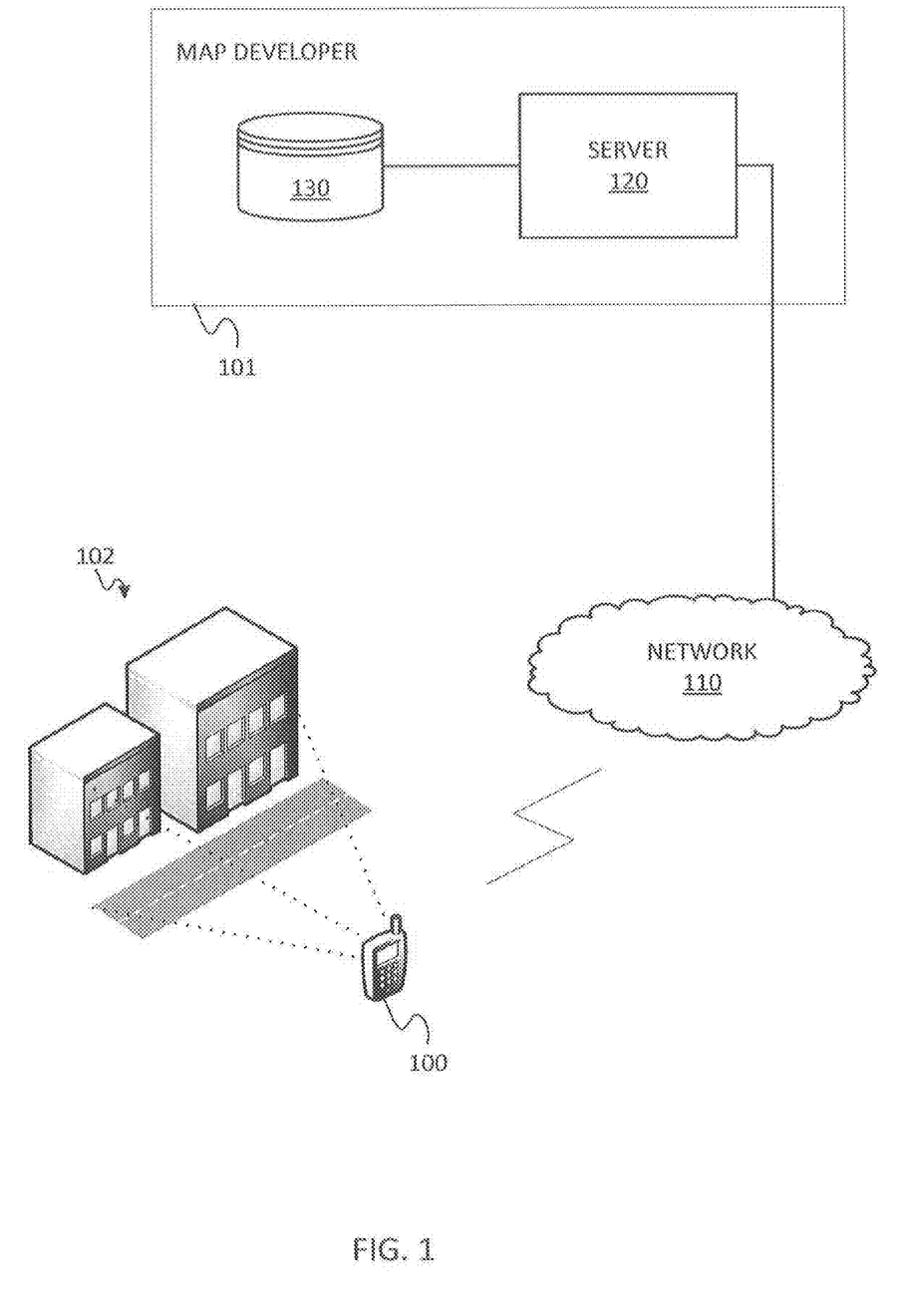
FIG. 1 illustrates an embodiment of a system for reporting errors in geographic data.

FIG. 1 illustrates an embodiment of a system for reporting errors in geographic data. The system includes a map developer 101, a network 110, and a mobile device 100. The mobile device 100 may be a cellular telephone, a mobile phone, a smart phone, a personal digital assistant ("PDA"), a camera, a tablet computer, a laptop, a personal navigation device ("PND"), a portable navigation device, and/or any other electronic device capable of capturing an image. An example object of an image is shown by street scene 102.

The map developer 101 includes at least the geographic database 130 and the server 120. The geographic database 130 includes geographic data used for navigation-related services. The geographic data may include road segment and node information. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may also represent points of interests (POIs) and/or street views. The POIs may include gasoline stations, hotels, restaurants, museums, stadiums, offices, automobile dealerships, auto repair shops, buildings, stores, statues, monuments, or geographic landmarks. The geographic data may also represent pedestrian features including pedestrian paths, sidewalks, crosswalks, parks, plazas and so on. The geographic database 130 may be produced and/or maintained by map developer 101, such as NAVTEQ North America, LLC located in Chicago, Ill.

The mobile device 100 captures an image of physical objects, such as the buildings shown by the street scene 102, as land-based image data. Land-based image data can be collected by a mobile device 100 carried by a person, a vehicle, or otherwise mounted but cannot be collected from a satellite or aircraft. The captured land-based image data is compared with the geographic data, such as compared with an outline template representing outlines of physical objects, generated from the geographic data, stored in the geographic database 130. From the comparison, an error report is generated. The error report aids the map developer in updating the geographic data.

In one implementation, the comparison of the land-based image data or spatial data with the outline template is performed by the mobile device 100. In another implementation, the comparison of the land-based image data with the outline template is performed by the server 120. The comparison is performed using an image processing technique, which may include an object recognition algorithm or a scale-invariant feature transform.

The network 110 and the communication paths between the map developer 101 and the network 110 may be any protocol or physical connection that is used to couple a server to a computer. The communication paths may utilize cellular, Ethernet, wireless, transmission control protocol (TCP), internet protocol (IP), or multiprotocol label switching (MPLS) technologies. In addition, the communication paths between the mobile device 100 and the network 110 may utilize cellular technologies including 3G, 4G, or WiMAX. As used herein, the phrases "in communication" and "couple" are defined to mean directly connected to or indirectly connected through one or more intermediate components. Such intermediate components may include both hardware and software based components. In other embodiments, the mobile device 100 is connected through a wire, such as USB cable, to the network 110. For example, the image data is stored in the mobile device 100 and downloaded to the network 110 once the mobile device 100 connects using a wired or wireless path to the network 110.

Figure 2:
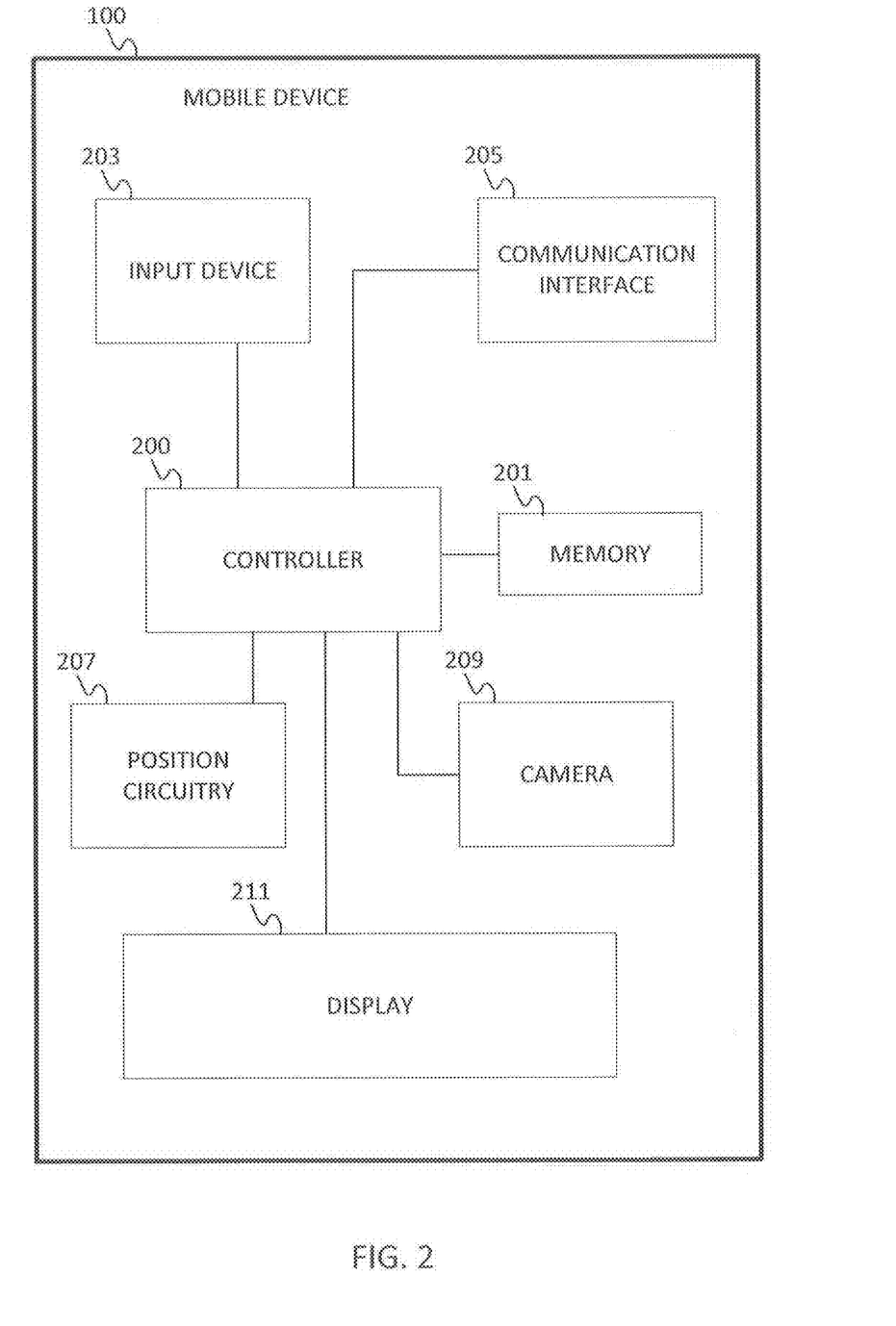
FIG. 2 illustrates a more detailed view of a mobile device of the system for reporting errors in geographic data.

FIG. 2 illustrates a more detailed view of a mobile device 100 of the system for reporting errors in geographic data. The mobile device 100 includes a controller 200, a memory 201, an input device 203, a communication interface 205, position circuitry 207, a camera 209, and a display 211.

The controller 200 may include a general processor, digital signal processor, ASIC, field programmable gate array, analog circuit, digital circuit, combinations thereof, or other now known or later developed processor. The controller 200 may be a single device or combinations of devices, such as associated with a network, distributed processing, or cloud computing. Any of various processing strategies may be used, such as multi-processing, multi-tasking, parallel processing, remote processing, centralized processing or the like.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may include an optical, magnetic (hard drive) or any other form of data storage device. The memory 201 may be removable from the mobile device 100, such as a secure digital (SD) memory card.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The communication interface 205 may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels may be used to create an operable connection. For example, the communication interface 205 may include an output communication interface devoted to sending signals, data, packets, or datagrams and an input communication interface devoted to receiving signals, data, packets, or datagrams. The communication interface 205 provides for wireless and/or wired communications in any now known or later developed format. The position circuitry 207 includes a global positioning system (GPS), cellular, or similar position sensor for providing location data. The location data may also include heading data generated by a magnetic sensor or compass in the position circuitry 207. The heading data may include two or three components, from which a viewing angle may be calculated. In addition, the position circuitry 207 may include one or more of an altimeter for providing altitude data, and an accelerometer, a gyroscope, or both for providing motion data.

The camera 209 may be configured to capture still and/or video images. The camera 209 includes, but is not limited to, a lens and circuitry for taking pictures. Additional, fewer, or different components may be provided. For example, a flash or flash circuitry may be provided. The camera 209 may be positioned so that the lens is facing away from the display 211 or is facing the same direction as the display 211. Alternatively, the camera 209 may be positioned in or configured to move in and face any number of directions.

Figure 3:
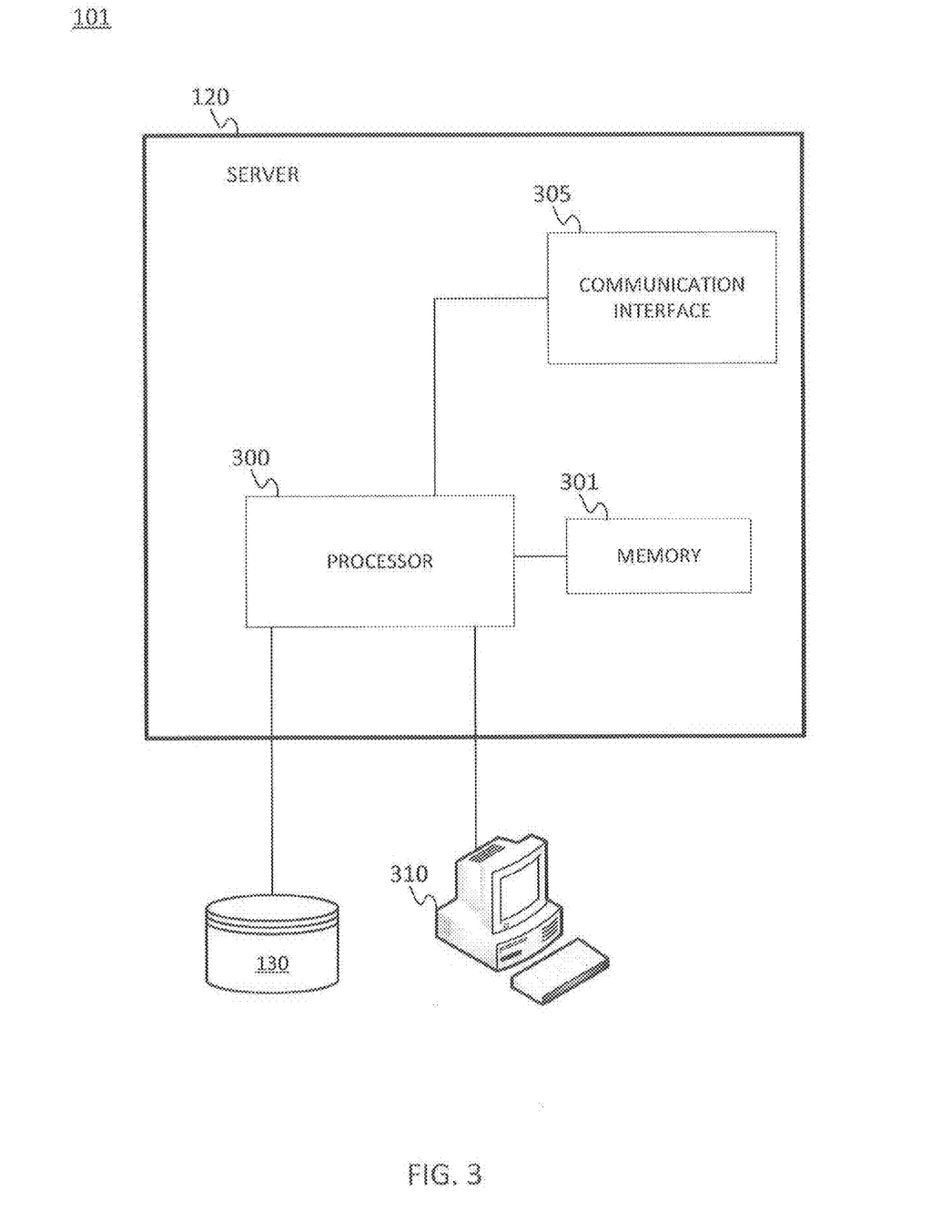
FIG. 3 illustrates a more detailed view of the map developer of the system for reporting errors in geographic data.

FIG. 3 illustrates a more detailed view of the map developer 101 of the system for reporting errors in geographic data. In addition to the geographic database 130 and the server 120, the map developer 101 may include a workstation 310. The server 120 may include a processor 300, a memory 301, and a communication interface 305. Additional, different, or fewer components may be used.

The geographic database 130 may be a memory, hard drive, flash drive, or any storage device. Further, various implementations of the processor 300, the memory 301, and the communication interface 305 may be made in the manner discussed above with respect to the controller 200, the memory 201, and the communication interface 205, respectively.

Four embodiments of the system for reporting errors in geographic data are described relating to the division of tasks between the mobile device 100 and the map developer 101. Additional, fewer, or different tasks may be performed by the mobile device 100 and the map developer 101, and any combination may be implemented.

In a first embodiment, the mobile device 100 provides a substantial portion of the necessary processing power. The position circuitry 207 identifies the current geographic location and heading of the mobile device 100, which is referred to as location data. The communication interface 205 transmits the location data to the server 120, which responds with at least a portion of an outline template, geographic data, or other derivative from the geographic data. The memory 201 stores the provided information, such as the outline template, as received from the map developer 101.

The camera 209 collects image data, and the controller 200 compares the image data with the geographic information to determine difference information. The controller 200 generates an error report based on the difference information. The error report may be stored in the memory 201 for later access or the error report may be transmitted to the map developer 101 by way of the communication interface 205.

The display 211 may indicate that the error report was generated and provide the user with a selection of saving the error report, sending the error report to the map developer 101, or deleting the error report. The user makes the selection by way of the input device 203. Alternatively, the user is not prompted or is otherwise unaware of the results or the error report. In a second embodiment, the map developer 101 provides a substantial portion of the necessary processing power. The mobile device 100 captures image data through camera 209. The mobile device 100 also determines location data using the position circuitry 207. In addition, the controller 200 couples the image data with the location data. The combined data, which may be referred to as georeferenced data, is transmitted to the map developer 101 through the communication interface 205. Typically, the map developer 101 is located at a location remote from the mobile device 100. The georeferenced data may include the location data and the image data in separate formats, packets, or transmissions or in a combined format, packet or transmission.

In the second embodiment, the map developer 101 provides the remaining steps for updating the geographic data. At the map developer 101, the processor 300 of server 120 is configured to generate an outline template outlining at least one physical object from geographic data. Rather than a template, the processor 300 may process or filter the geographic data for comparison. In alternative embodiments, the geographic data is used without further processing. The processor 300 may identify the appropriate portion of the geographic data from the location data received from mobile device 100. The processor 300 is configured to compare the image data with the geographic data, such as comparing the outline template with the geographic data, to generate difference information. The difference information is used to create an error report for updating the geographic data. The error report may be provided by the processor 300 and stored in the memory 301 or displayed via the workstation 310.

In a third embodiment, the mobile device 100 and the map developer 101 more evenly divide the processing requirements for updating geographic data. The mobile device 100 performs a preliminary comparison and the map developer performs a detailed comparison. The position circuitry 207 identifies the current geographic location and heading of the mobile device 100. The location data is transmitted to the map developer 101, which returns an outline template or other geographic data.

The controller 200 makes a preliminary comparison between the outline template or other geographic data and the image data. The result of the preliminary comparison may be a preliminary error report. If one or more mismatches or errors are detected by controller 200, the mobile device 100 sends the image data and the preliminary error report to the map developer 101. The preliminary error report may trigger the controller 200 to automatically record additional image data through the camera 209, or prompt a user of the mobile device to acquire one or more additional photos of the physical object using the camera 209 as well as additional information regarding the physical objects, such as an address of the building, a number of floors of the building, a business located in the building, entrance information and so on.

At the map developer 101, the processor 300 performs a more robust comparison of the image data and the outline template or the original geographic data, using one or more of the techniques discussed below, to calculate difference information, which may be provided to the memory 301 or the workstation 310. In alternative embodiments, the roles of the mobile device 100 and the map developer 101 are reversed such that the preliminary analysis is performed by the processor 300 and the mobile device 100 performs the more robust comparison.

In a fourth embodiment, the method for updating geographic data is performed solely on the mobile device 100. In this scenario, the mobile device 100 may be a portable navigation device including a geographic database similar to the database 130 and stored in the memory 201 or accessed from an external storage by way of the network 110. The position circuitry 207 identifies the current geographic location and heading of the mobile device 100. The controller 200 accesses the geographic data based on this location data and obtains the outline template or otherwise accesses geographic data for comparison.

As image data becomes available through the camera 209 and the viewing application, the controller 200 compares the image data to the outline template simultaneous to executing the viewing application. An error report is generated by the controller 200 based on the differences, and the controller 200 uses the error report to update the geographic data in the geographic database used by the mobile device 100. In addition, other mobile devices may benefit from the update performed by the mobile device 100 through community sharing. Periodically, these updates may be accessed from the mobile device's geographic database by the map developer 101 for updating a primary geographic database. For example, the map developer 101 has a mobile station for correcting the geographic database. As the station drives to different areas, the comparison is made to determine differences between previously acquired data and the data acquired using the camera.

Figure 4:
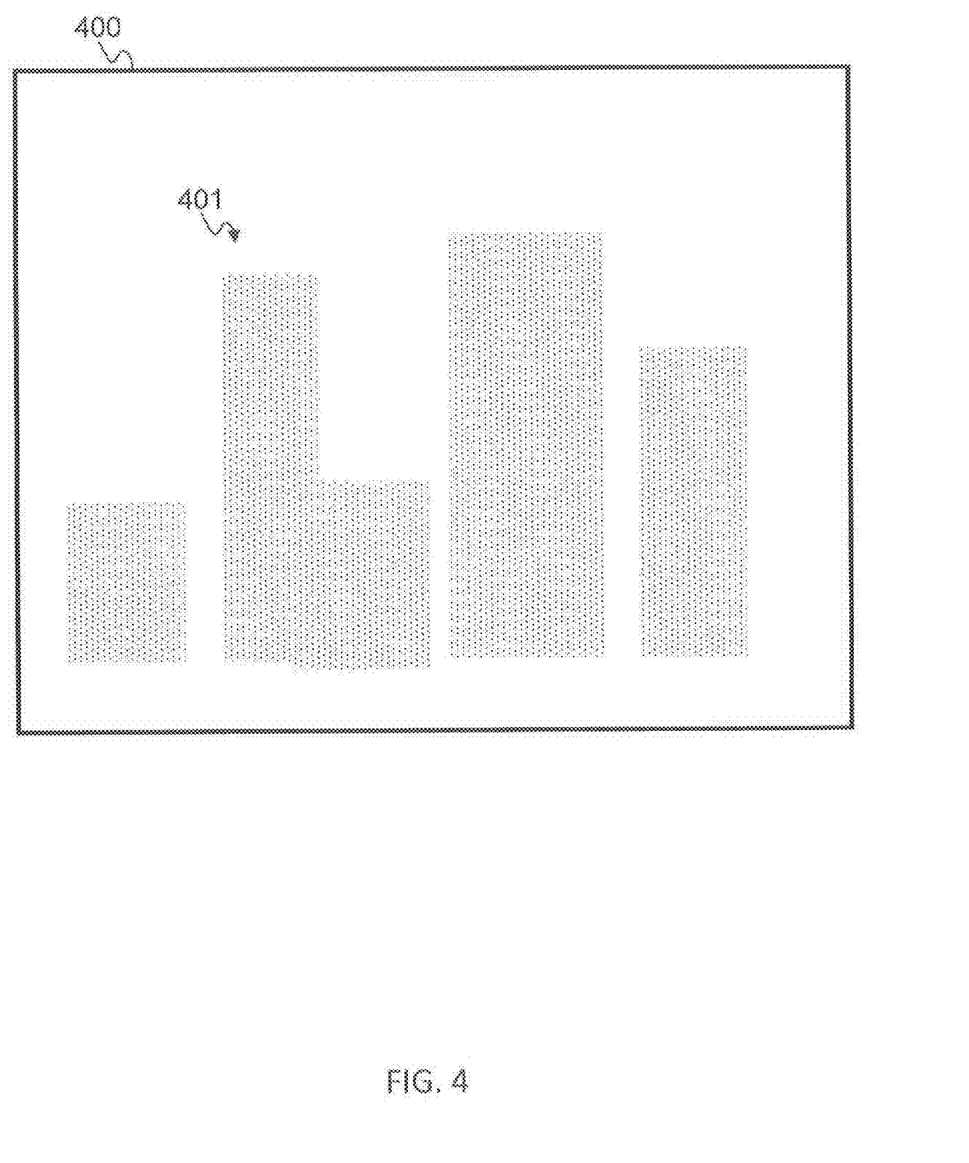
FIG. 4 illustrates an example graphical representation of sensor data.

FIG. 4 illustrates an example graphical representation 400 of the sensor data 401 stored as part of the geographic data. The sensor data 401 may be collected using a laser, a video camera, a still image camera, or any sensing device that senses or receive light. For example, light detection and ranging ("LIDAR"), which may also be referred to as 3D laser scanning, uses one or more lasers to collect data points representing a surrounding area, such as an area about a road or path. The LIDAR device collects and gathers data points in a point cloud, such as a 3D point cloud, in which each data point corresponds to a local coordinate, such as (x, y, z), and is either on or off. Alternatively, a grayscale 3D point cloud may additionally include an intensity for each data point and a color 3D point cloud may include an intensity for each of three or more colors in a color space. The intensity for each point has a value. For example, in grayscale, the value may range from 0 for black to 255 for white or vice versa. The 3D point cloud may be stored in ASCII or LIDAR exchange format. The one or more lasers may be in a near infrared spectrum (such as about 700 nm to about 5000 nm or about 800 nm to about 2500 nm) or other light spectrum.

The sensor data 401 may be collected by the map developer 101. For example, a vehicle may be equipped with sensors, such as the LIDAR device, and drive along roads. The sensors within the LIDAR device may rotate over a range of angles, such as 180°, 360°, or at an angle slightly greater than 360°. The light emitted and received by the LIDAR device is used to configure data points into the 3D point cloud. For example, each point on a physical object from which light is bounced or reflected is represented as a data point in a coordinate system. In one implementation, the 3D point cloud or the sensor data 401 may be used as an outline template without additional processing. The sensor data 401 may have any resolution sufficient to provide outlines of physical objects. The sensor data in FIG. 4 is a pattern provided for illustration purposes only. Real world sensor data may be more irregular and include outlier data points, which may be filtered from the sensor data 401.

Figure 5:
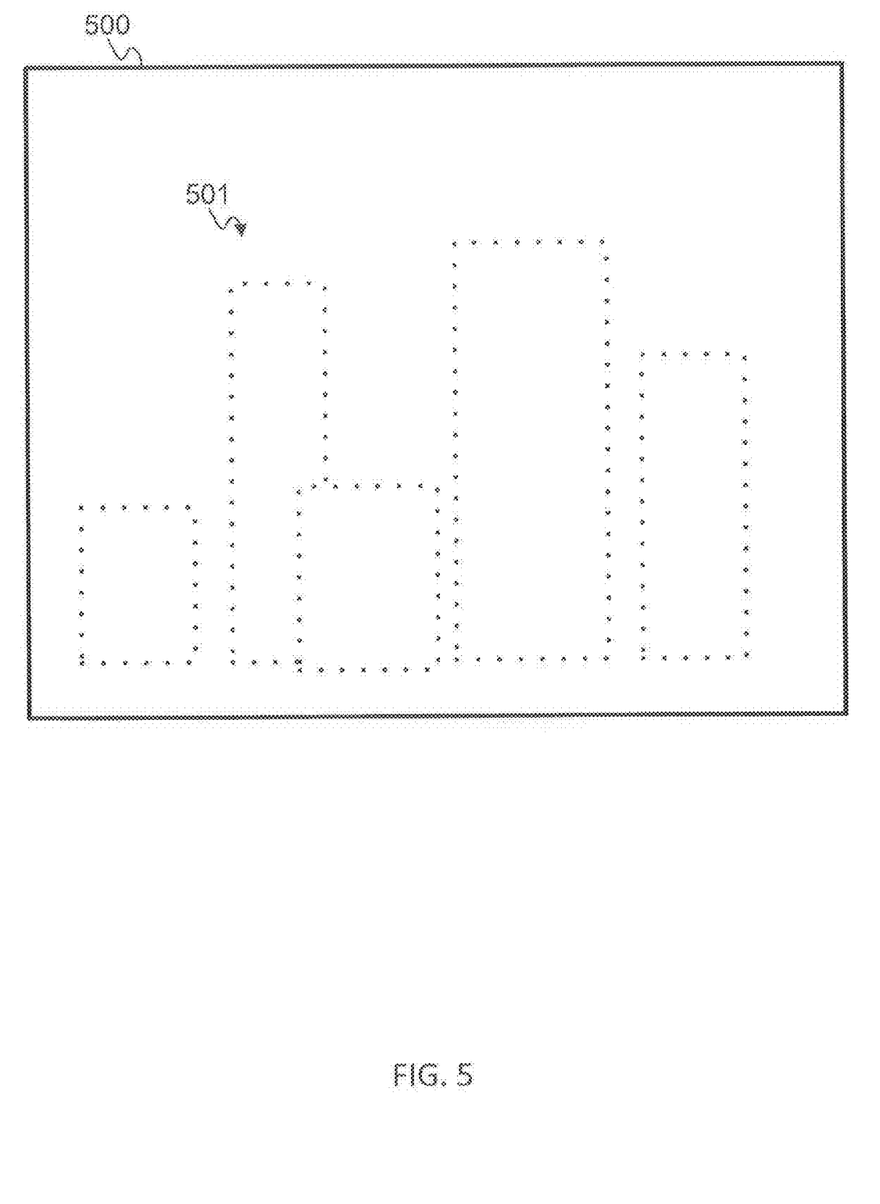
FIG. 5 illustrates an example graphical representation of an outline template.

FIG. 5 illustrates an example graphical representation 500 of an outline template 501 of physical objects. The outline template 501 may not be graphical. Instead, the outline template 501 may comprise a simple text format with coordinates for a plurality of points that make up the outline template 501, which is indexed by location and/or heading data. The template 501 may also be encoded as relational data format (RDF), geographic data format (GDF), or extensible markup language (XML) format.

The outline template 501 may be generated directly from an image using an edge detection algorithm. For example, changes in brightness indicate discontinuities in depth, surface orientation, or material properties, which tend to indicate the end of one object and the beginning of another object. The edge detection algorithm may be either search-based or zero-crossing based. Search-based algorithms, which may also be referred to as gradient techniques, involve searching for a threshold change in intensity to identify local minimums and maximums of the first derivative of the image data. Zero-crossing based algorithms, which may be referred to as Laplacian techniques, involve detecting zero crossings in the second derivative of the image data. Directional filtering may be used, such as filters with kernels configured to identify horizontal, vertical, or lines at other angles.

The outline template 501 may be generated directly from an image using a geometric algorithm. In one implementation, the data points of the 3D point cloud are projected onto a 2D plane. The outer points of the projected 2D data set may be traced to determine a boundary, such as using convex hull techniques or other techniques. For example, the projected 2D data are triangulated and the boundary edges are kept. This set of boundary edges becomes the outline template 501. The projection and scale may be based from the location of a viewer, such as from a location indicated by the mobile device.

The edge detection algorithm or the geometric algorithm identifies the outlines of physical objects in the image data, which can be stored as a relatively small amount of data as the outline template 501. The outline template 501 is compared to image data collected by the mobile device 100. In the alternative to both the geometric algorithm and the edge detection algorithm, the sensor data 401 may be used as the outline template 501 and directly compared with the image data collected by the mobile device 100.

Figure 6:
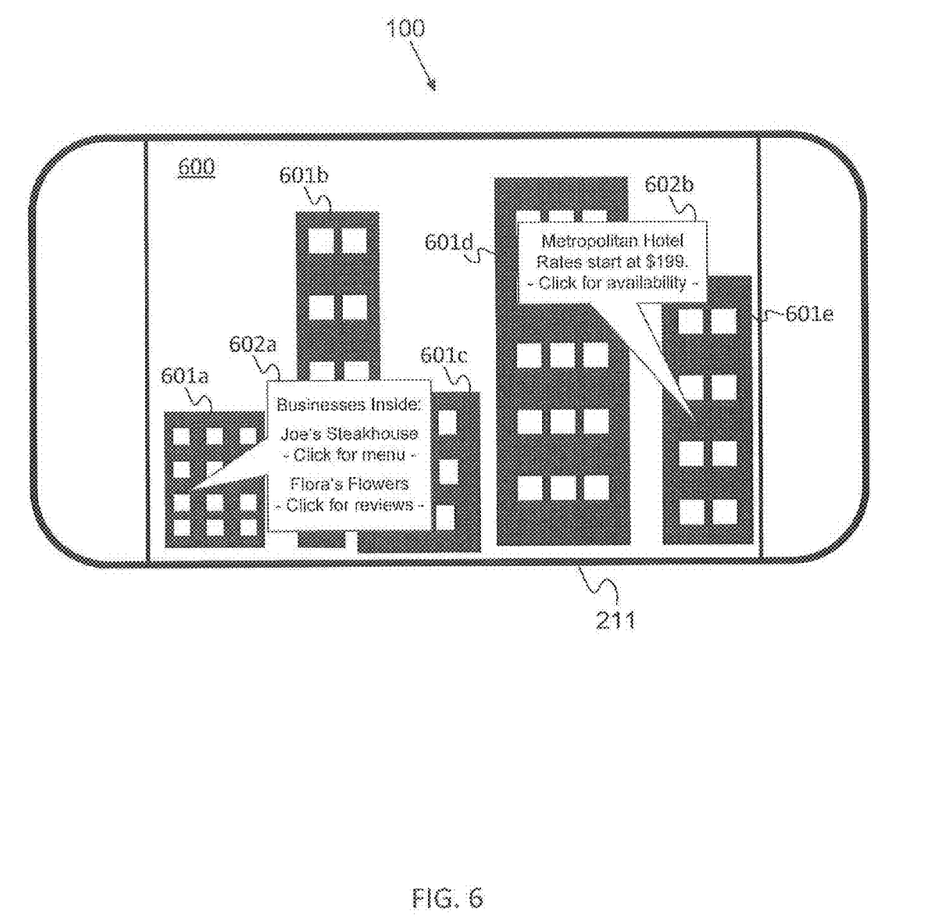
FIG. 6 illustrates a mobile device running an augmented reality application.

FIG. 6 illustrates a mobile device 100 running an augmented reality application 600, as shown on display 211. The augmented reality application 600 may be stored in the memory 201 and executed by the controller 200. The augmented reality application 600 enhances a user's view of the real world with virtual content. The virtual content is displayed in a layer above the real world content, which is captured by the camera 209. The virtual content provides information regarding the real world content. As shown by FIG. 6, the real world content includes physical objects or buildings 601a-e, and the virtual content includes callouts 602a-b listing business names and hyperlinks to additional information regarding the business located within the buildings. Other examples of the virtual information include business names, landmark names, resident names, addresses, hours of operation, menus, prices, reviews, show times, ticket availability, scores, and other information.

The augmented reality application may also provide direction or navigation services. For example, the virtual content layer may include street names, distances to places, landmarks or POIs, or names of places, landmarks or POIs, speed limits, turn restrictions, or time to destination. Further the virtual content may include public transportation information such as bus stops, train stations, and departure/arrival times.

The augmented reality application is an example of a viewing application. A viewing application is any program that enables the mobile device to receive image data. The simplest viewing application is a camera application. When a picture is taken, the camera 209 captures image data. Even when the camera 209 is not taking a picture, image data may be captured or analyzed as the mobile device 100 is panned around to display an image of a real world scene on the display 211.

The viewing application may be compatible with a Windows operating system, a Symbian operating system, an Android operating system, iOS, and/or other operating systems. Examples of augmented reality applications include Wikitude, Layar Reality Browser, Cyclopedia, and Nearest Places.

Figure 7:
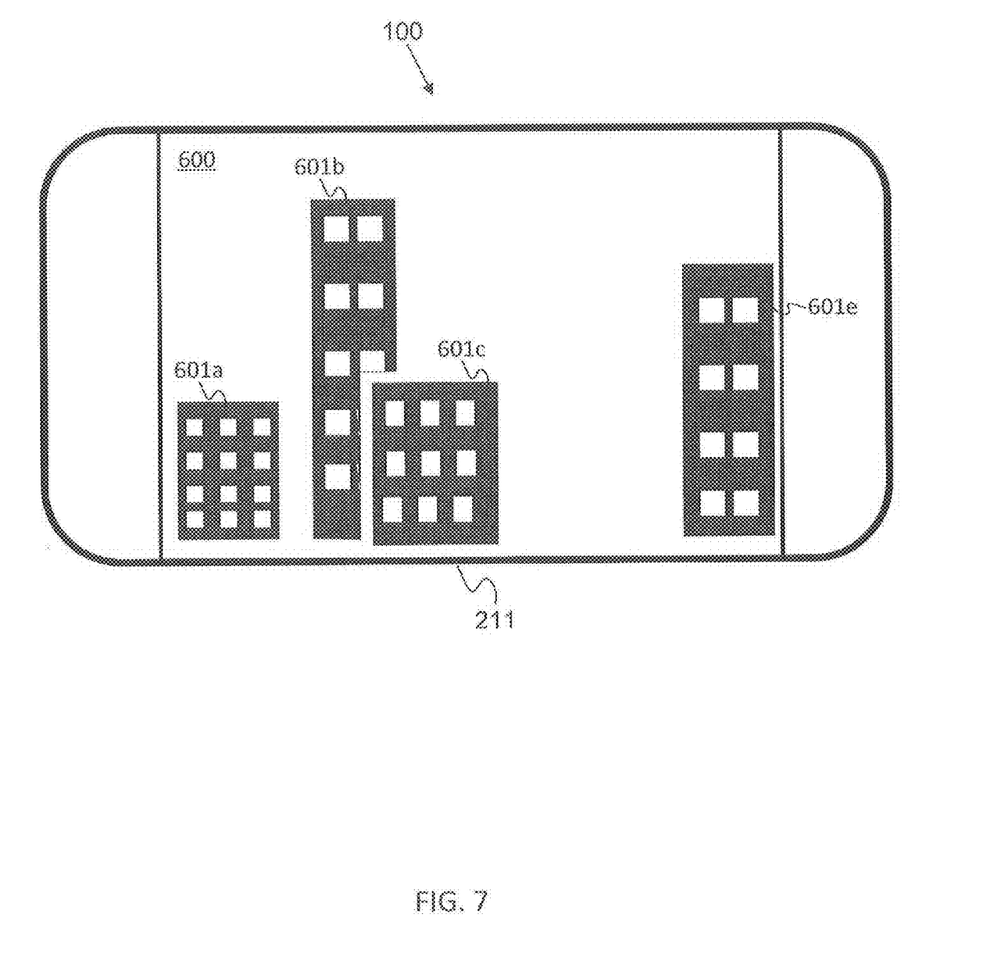
FIG. 7 illustrates the mobile device for reporting errors in geographic data.

FIG. 7 illustrates the mobile device 100 at a later time than in FIG. 6. In this view, the viewing application has captured the image of physical objects or buildings 601a-c and 601e but physical object or building 601d no longer exists. The image data is compared with the outline template 501 to create difference information. The difference information may simply provide an indication that a difference was detected between the image data and the outline template 501. Alternatively, the difference information may indicate that the difference is associated with physical object 601d specifically, or the difference information may include the coordinates of each point in the outline template 501 that did not match up to the image data.

The comparison of the image data with the outline template 501 may be implemented using 3D to 2D edge matching, a feature based geometric technique, or other techniques. Feature based geometric techniques identify and extract features from one or more fixed views, and match the features to the outline template 501 using geometric constraints. Example feature based geometric techniques include scale-invariant feature transform (SIFT) and Harris affine region detector. In one embodiment, the image data is processed to create an outline viewer location, scale, and direction. The resulting outline is compared with the template outline.

The comparison of the image data and the outline template 501 may be governed by a matching constraint. The matching constraint may define a number of differing points required to trigger the error report, a threshold level between intensities that defines the differing points, or a confidence level of the comparison. In addition or in the alternative, the matching constraint may define a required time delay between the fixed views. The time delay insures that the fixed views, which must be substantially similar to begin the comparison with the image data, do not include a moving object, such as a person, a bird, or a car, that may compromise the results of the comparison.

Figure 8:
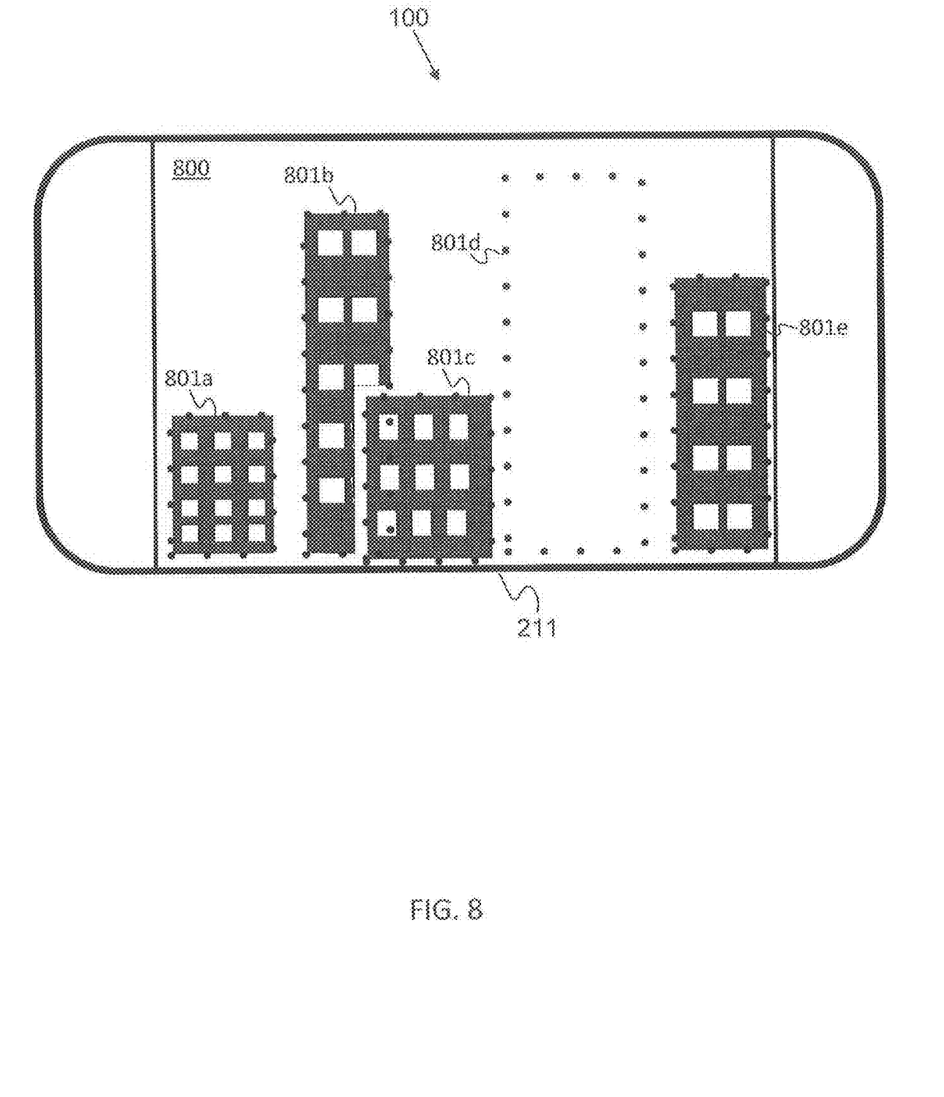
FIG. 8 illustrates another embodiment of a mobile device for reporting errors in geographic data.

FIG. 8 illustrates another embodiment of the mobile device 100 for reporting errors in geographic data. A graphical representation 800 of the outline template 501 and the image data is shown on display 211. The outline template 501 includes outlines 801a-e, which correspond to buildings 601a-e. In this embodiment, the end user can easily see when the outline template 501 does not match up with the image data displayed by the viewing application.

The display of the outline template 501 may be unnecessary or not provided because the error report is generated automatically. Alternatively, the user may recognize the mismatch between the outline 801d and the image data and input an indication to input device 203 to initiate the comparison of the image data with the outline template 501 or to cause an error report to be generated, which may be performed either by the mobile device 100 or the map developer 101.

Figure 9A:
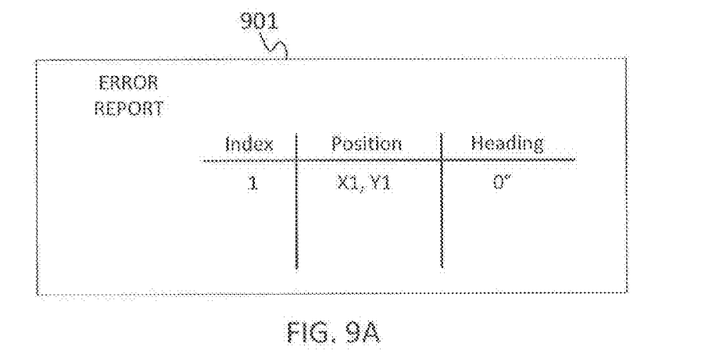
FIG. 9A illustrates a first example of an error report generated by the mobile device of FIG. 2 or the map developer of FIG. 3.
Figure 9B:
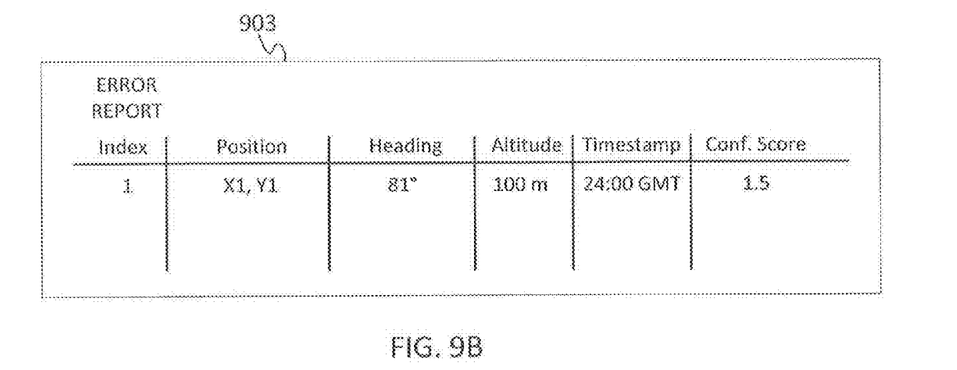
FIG. 9B illustrates a second example of an error report.
Figure 9C:
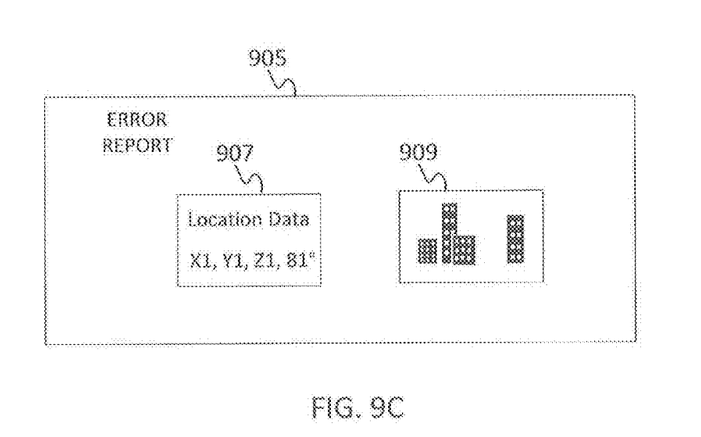
FIG. 9C illustrates a third example of an error report.

FIGS. 9A-C illustrate example error reports that may be generated by the mobile device 100 of FIG. 2 or the map developer 101 of FIG. 3. Either or both of the controller 200 and the processor 300 may be configured to generate error report by executing a error report application including software or code for compiling the difference information from the comparison between image data and the outline template 501. The error report may be text-based and may be structured as an email or a short message service (SMS) including sender information associated with the map developer 101. The error report may include extensible markup language (XML) and/or hypertext markup language (HTML).

In at least the first embodiment, the error report may sent, transmitted, and/or uploaded to the map developer 101 or the geographic database 130 via the network 110. The network 110 is the Internet, an intranet, a local area network ("LAN"), a wide area network ("WAN"), a virtual private network ("VPN"), a cellular network, a satellite network, a broadcasting network, a wireless or wired connection, and/or any known or future network or connection. The error report may be transmitted upon creation or the error report may be stored by the memory 201.

FIG. 9A illustrates an error report 901 that includes location data and an index. The location data may include a position provided by a GPS sensor and a heading provided by a magnetic sensor. The location data may also include a field of view or angle of view of the camera.

FIG. 9B illustrates an error report 903 that includes two coordinate position data, an index, a heading, an altitude, a timestamp, and a confidence score that a mismatch actually occurred between the image data and the outline template 501. In addition, the error report 903 may include a second set of coordinate data that describes where in the image data the mismatch or error occurred.

FIG. 9C illustrated an error report 905 that includes location data 907 and image 909. The image 909 may be the image data captured by the camera 209. The location data 907 may include two or three position coordinates and a heading. Other combinations of information may be provided for the error report, for example the information of FIGS. 9A-C, other information, or combinations thereof are provided in one error report or a series of error reports.

Figure 10:
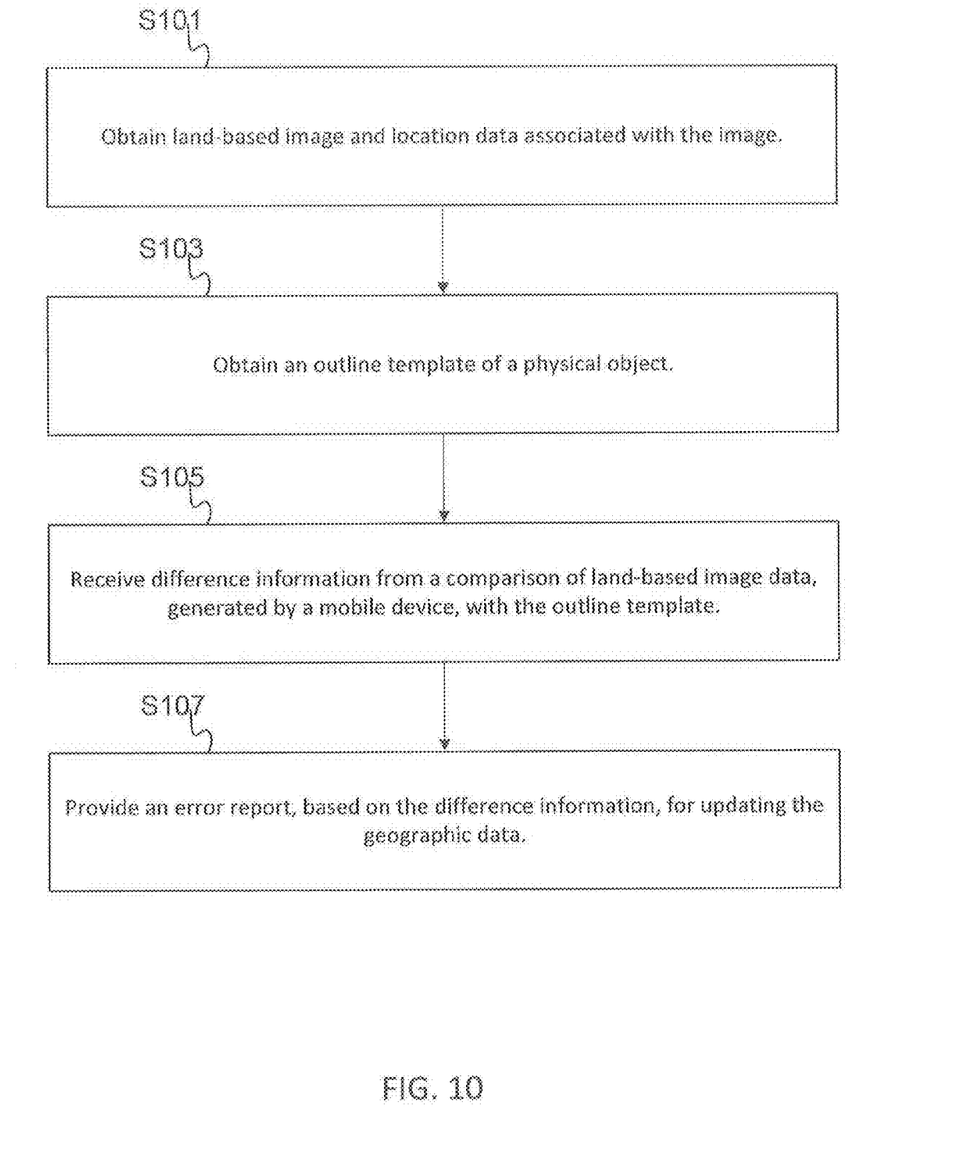
FIG. 10 illustrates an example embodiment of an algorithm for updating geographic data.

FIG. 10 illustrates a flow chart for an algorithm for reporting errors in a geographic database. At S101, an image from a land-based point of view is obtained. Additionally, location data for the image is also obtained. The location data identifies the geographic location and heading of the camera that captured the image. The location data may also identify a field of view or angle of view of the camera.

At S103, an outline template of at least one physical object is obtained using the location data for the image. The outline template provides a depiction of the physical objects, such as buildings, as represented by data in the geographic database of the map developer. The physical objects depicted in the outline template are the physical objects that were present in the geographic area at the time the geographic data was created or last updated. The outline template may be obtained from memory 201 of a mobile device 100 or from memory 301 of the map developer server 120. Additionally, the outline template may be generated by controller 200 of a mobile device 100 or by processor 300 of the map developer server 120. The outline template may be LIDAR data or may be derived from LIDAR data. Alternatively, the outline template may be imagery data, which are still images collected by systematically traveling roads, or derived from imagery data.

At S105, difference information from a comparison of land-based image data to the outline time is received. The land-based image data is collected a current time or time later than the time when the geographic data was created or last updated. The difference information may be received at the map developer 101 from the mobile device 100, received from the map developer server 120 from generation by the map developer server 120, or received at the workstation 310 from the map developer server 120. Prior to comparison of the image data and the outline template, the outline template may be adjusted by projection and/or scale to create an outline template of physical objects within the image that approximately matches the physical objects depicted in the image data.

In one embodiment, difference information is received from a plurality of different locations. As different mobile device users implement augmented reality, the comparison is triggered. The different mobile device users may or may not know of the comparison. For example, users may agree to allow their mobile devices to be used for comparison. By performing comparisons using many mobile devices at many locations, the geographic data may be more comprehensively checked for continuing accuracy.

At S107, an error report is provided based on the difference information. The error report may be a simple text string received via HTML, email, or SMS, including the location of the difference report. The error report may be a compilation or errors stored over a predetermined time period. The error report may include the location-based image data. The error report is provided where a sufficient difference results from the comparison. Where no or an insufficient difference results, an error report may or may not be generated. An error report may indicate verification of the geographic data at a location as having continued accuracy (e.g., no error).

In any case, the error report is used by either the mobile device 100 or map developer 101 to update the geographic data. The update may occur automatically if the location-based image data is sufficient to provide the update. Alternatively, the error report may trigger the map developer 101 to dispatch an agent to visit the particular geographic location to collect addition data for the update. In the case of imagery data being used as the geographic data stored in the database, location-based image data may be directly substituted into the geographic database.

In an alternative embodiment, the error report of step S107 is not generated. The difference information from step S105 is used either by the mobile device 100 or map developer 101 to update the geographic data. For example, the difference information may indicate that a new building exists at a specified location, and the geographic data is updated to represent the new building. The location based image data may be further analyzed to obtain various attributes of the geographic features depicted in the image. The attributes of the geographic features are included in the geographic data.

The embodiments described above may be implemented using computer executable instructions stored in the memory 201 and/or the memory 301, which are non-transitory. The processors may execute computer executable instructions.

The computer executable instructions may be written in any computer language, such as C++, C#, Java, Pascal, Visual Basic, Perl, HyperText Markup Language (HTML), JavaScript, assembly language, extensible markup language (XML) and any combination thereof.

The computer executable instructions may be logic encoded in one or more tangible media or one or more non-transitory tangible media for execution by the processors. Logic encoded in one or more tangible media for execution may be defined as instructions that are executable by the processors and that are provided on the computer-readable storage media, memories, or a combination thereof. Instructions for instructing a network device may be stored on any logic. As used herein, "logic", includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an application specific integrated circuit (ASIC), an analog circuit, a digital circuit, a programmed logic device, and a memory device containing instructions.

The computer readable instructions may be stored on any non-transitory computer readable medium. A non-transitory computer readable medium may include, but are not limited to, a floppy disk, a hard disk, an ASIC, a compact disk, other optical medium, a random access memory (RAM), a read only memory (ROM), a memory chip or card, a memory stick, and other media from which a computer, a processor or other electronic device can read.

Various embodiments described herein can be used alone or in combination with one another. The foregoing detailed description has described only a few of the many possible implementations of the present invention. For this reason, this detailed description is intended by way of illustration, and not by way of limitation.

I claim:

1. A method for updating geographic data, the method comprising:
    receiving, from a mobile device, an indication of a geographic location of the mobile device;
    providing, to the mobile device from a geographic database located remotely from the mobile device, with a processor, an outline template representing an outline of at least one physical object from the geographic data for the geographic location, wherein the geographic data includes distance information and the geographic data is collected by a light detection and ranging (LIDAR) sensor before the indication of the geographic location is received from the mobile device, wherein data from the LIDAR sensor is filtered to generate the outline template representing the outline of the at least one physical object;
    receiving difference information from a comparison of land-based image data, generated from the mobile device at the geographic location, with the outline template of the at least one physical object, wherein the land-based image data is generated using an edge detection algorithm or a geometric algorithm to identify physical objects in the land-based image data for the comparison with the outline template; and
    providing an error report, based on the difference information from the comparison of land-based image data with the outline template of the at least one physical object, for updating the geographic data, the error report indicative of an error in the outline template.

2. The method of claim 1, further comprising:
    receiving the land-based image data from the mobile device; and
    generating the difference information at a location remote from the mobile device.

3. The method of claim 1, wherein the difference information is generated on the mobile device and received by an entity maintaining the geographic data.

4. The method of claim 1, further comprising:
    initiating, in response to the error report, a dispatch request for a visual inspection of the geographic location.

5. The method of claim 1, further comprising:
    prompting, in response to the error report, a user of the mobile device to acquire a photo of the at least one object; and
    receiving the photo taken by the user in response to the prompt.

6. The method of claim 1, further comprising:
    generating the difference information from the comparison of the land-based image data with the representation of the at least one physical object using an object recognition algorithm or a scale-invariant feature transform.

7. The method of claim 1, further comprising receiving the land-based image data from an augmented reality application.

8. The method of claim 1, wherein the at least one physical object includes a building, road furniture or point of interest.

9. An apparatus for detecting errors in geographic data comprising:
    a database configured to store an outline template derived from the geographic data by filtering light detection and ranging (LIDAR) sensor data, the outline template representing physical objects at a plurality of different locations from at least one previous time; and
    a processor configured to: (1) receive spatial information derived from an edge detection algorithm or a geometric algorithm performed on an image from a land-based mobile device and receive a geographic location of the land-based mobile device, the spatial information representing a first of the physical objects at a later time, (2) compare the spatial information with the outline template representing the first physical object, (3) indicate a difference between the outline template from the at least one previous time and the spatial information from the later time, and (4) generate an error report based on the difference, the error report indicative of an error in the outline template,
    wherein the spatial information is collected by a viewing application, wherein the viewing application includes a camera view and additional information related to objects in the camera view,
    wherein the error report includes location data and one or more of a heading, an altitude, a timestamp, a confidence score, and the image from the land-based mobile device.

10. The apparatus of claim 9, wherein the land-based mobile device includes the processor.

11. The apparatus of claim 9, wherein an entity for maintaining the geographic data includes the processor.

12. The apparatus of claim 9, wherein the viewing application includes augmented reality.

13. The apparatus of claim 9, wherein the processor is configured to generate the spatial information from the geographic location of the land-based mobile device and heading data of the land-based mobile device.

14. The apparatus of claim 9, wherein the processor is configured to compare the spatial information with the outline template using an object recognition algorithm or a scale-invariant feature transform.

15. A non-transitory computer readable medium configured to store a computer program configured to perform a method for updating geographic data, the method comprising:

generating a first template of an object associated with a geographic location from the geographic data from filtered sensor data;

receiving a second template of the object from a mobile device running an augmented reality application viewing the object, wherein the augmented reality application includes a camera view and additional information related to objects in the camera view, wherein the mobile device is located adjacent to the geographic location;

analyzing differences between the first template and the second template as an error report; and updating the geographic data according to the error report, wherein generating the first template further comprises:

collecting the geographic data using light detection and ranging (LIDAR); and identifying physical objects in the geographic data as the first template.

16. The method of claim 1, wherein providing the outline template is performed in response to receiving the indication of the geographic location.

17. The method of claim 1, wherein the error report identifies a physical object.

* * * * *